(12) United States Patent
Aoyama et al.

(10) Patent No.: US 11,179,818 B2
(45) Date of Patent: Nov. 23, 2021

(54) SUPPLY ROD FOR SHAFT-LIKE COMPONENT

(71) Applicant: Shoji Aoyama, Osaka (JP)

(72) Inventors: Shoji Aoyama, Sakai (JP); Yoshitaka Aoyama, Sakai (JP)

(73) Assignee: Shoji Aoyama, Osaka (JP)

( * ) Notice: Subject to any disclaimer, the term of this patent is extended or adjusted under 35 U.S.C. 154(b) by 0 days.

(21) Appl. No.: 16/959,488

(22) PCT Filed: Dec. 3, 2018

(86) PCT No.: PCT/JP2018/044344
§ 371 (c)(1),
(2) Date: Jul. 1, 2020

(87) PCT Pub. No.: WO2019/159496
PCT Pub. Date: Aug. 22, 2019

(65) Prior Publication Data
US 2021/0039208 A1    Feb. 11, 2021

(30) Foreign Application Priority Data
Feb. 13, 2018    (JP) .............................. JP2018-038007

(51) Int. Cl.
*B23P 19/06* (2006.01)
*B65G 47/08* (2006.01)

(52) U.S. Cl.
CPC .............. *B23P 19/06* (2013.01); *B65G 47/08* (2013.01)

(58) Field of Classification Search
CPC .......... B23P 19/06; B23P 19/04; B65G 47/08; B23K 11/14
See application file for complete search history.

(56) References Cited

U.S. PATENT DOCUMENTS

| | | | |
|---|---|---|---|
| 2,676,506 A | * | 4/1954 | Schultz ................... B25B 23/10 81/54 |
| 3,126,774 A | * | 3/1964 | Carr et al. .............. B25B 23/12 81/125 |

(Continued)

FOREIGN PATENT DOCUMENTS

| | | |
|---|---|---|
| JP | 2-56304 | 2/1990 |
| JP | 02-56305 | 2/1990 |

(Continued)

OTHER PUBLICATIONS

International Search Report dated Feb. 12, 2019 in International (PCT) Application No. PCT/JP2018/044344.

(Continued)

*Primary Examiner* — Rick K Chang
(74) *Attorney, Agent, or Firm* — Wenderoth, Lind & Ponack, L.L.P.

(57) ABSTRACT

A projection portion is formed on a distal end surface of a supply rod with which a surface of a flange is to be brought into close contact. A circular-arc receiving surface fitting an outer peripheral portion is formed at a boundary portion between the distal end surface and the projection portion. One side of the circular-arc receiving surface is continuous with the distal end surface, and another side of the circular-arc receiving surface is continuous with a regulation inner surface formed on the projection portion in a state of being opposed to the distal end surface. With this, a receiving groove is formed, and a control gap is defined between the regulation inner surface and the flange. The close contact of the surface with the distal end surface is achieved with a magnet of an advancing/retreating type provided in the supply rod.

1 Claim, 3 Drawing Sheets

(56) References Cited

U.S. PATENT DOCUMENTS

| | | | | |
|---|---|---|---|---|
| 3,864,804 A * | 2/1975 | Kawaguchi | ............ | B23Q 7/106 |
| | | | | 72/21.4 |
| 5,035,039 A * | 7/1991 | Aoyama | ................ | B23P 19/04 |
| | | | | 29/445 |
| 5,230,141 A * | 7/1993 | Aoyama | ................ | B23K 11/14 |
| | | | | 29/719 |
| 9,616,532 B2 * | 4/2017 | Neumeier | .............. | B25J 9/1687 |

FOREIGN PATENT DOCUMENTS

| JP | 11-239885 | 9/1999 |
|---|---|---|
| JP | 2015-131339 | 7/2015 |

OTHER PUBLICATIONS

International Preliminary Report on Patentability and Written Opinion of the International Searching Authority dated Aug. 18, 2020 in corresponding International (PCT) Patent Application No. PCT/JP2018/044344.

\* cited by examiner

FIG. 1A
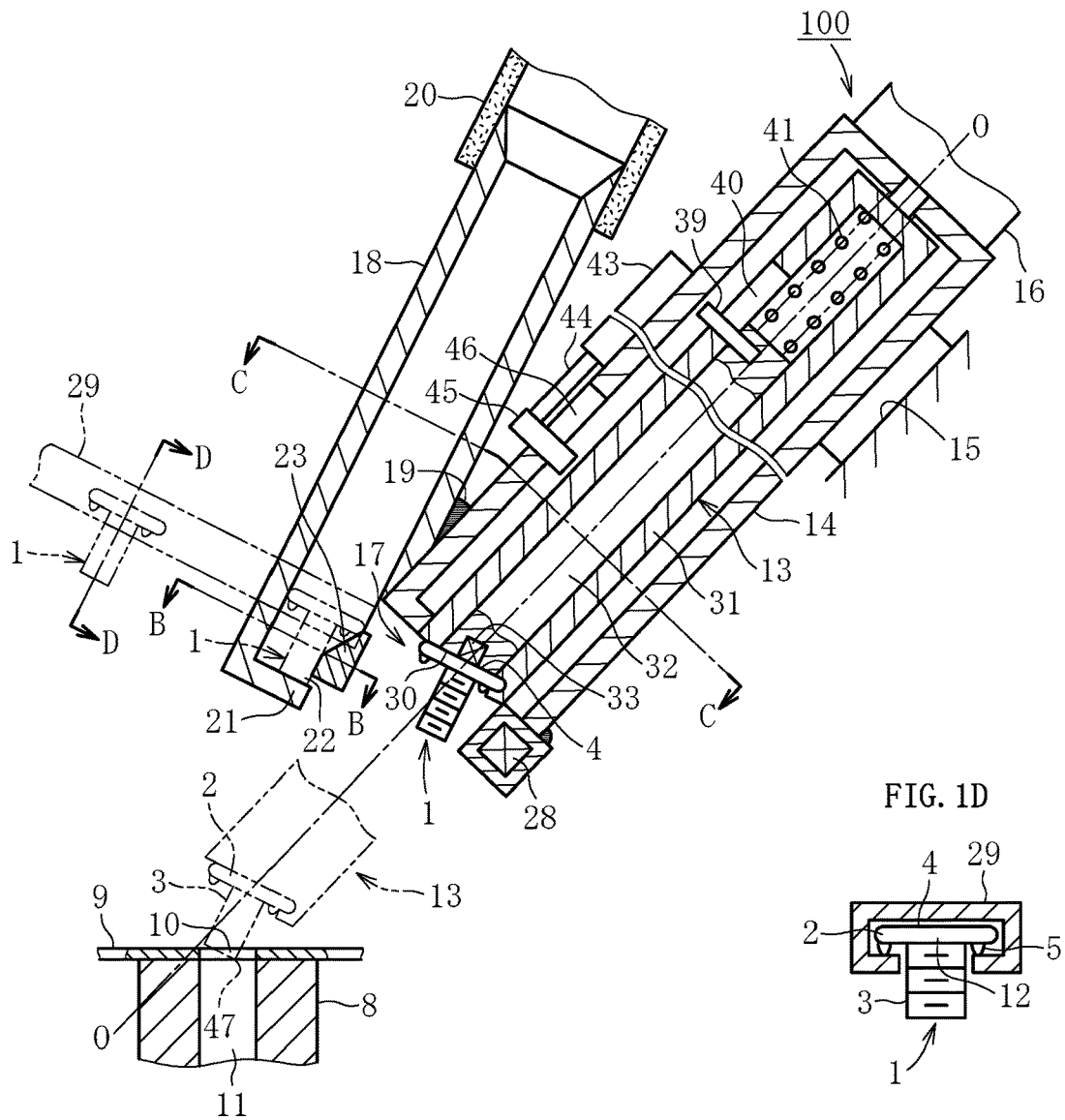
FIG. 1D
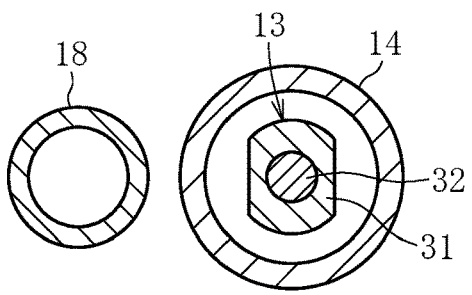
FIG. 1B
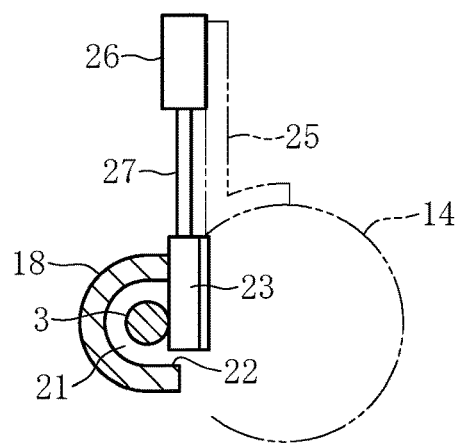
FIG. 1C

SUPPLY ROD FOR SHAFT-LIKE COMPONENT

TECHNICAL FIELD

This invention relates to a supply rod configured to supply a shaft-like component having a circular flange and a shaft portion integrated with each other.

BACKGROUND ART

A supply rod described in Japanese Patent Application Laid-open No. Hei 2-56305 (Patent Literature 1) is configured to supply a shaft-like component having a circular flange and a shaft portion integrated with each other. In use of this supply rod, the flange is brought into close contact with a distal end surface of the supply rod having a projection piece, and a distal end portion of the shaft-like component is advanced to a vicinity of a target location. After that, the close contact of the flange is released, and the shaft-like component is inserted into an opening as the target location, while allowing the shaft-like component to make a circular-arc motion about the projection piece of the supply rod.

CITATION LIST

Patent Literature 1: JP 2-56305 A

SUMMARY OF INVENTION

Technical Problem

The supply rod described in the patent literature 1 mentioned above has the projection piece having a shape obtained by bending a plate-shaped member into a substantially V-shape. When the flange is held in close contact with the distal end surface of the supply rod, the flange of the shaft-like component is held in point contact at an outer peripheral portion thereof with an inner surface of the projection piece. When such point contact is given, application of even a slight force may cause displacement of the flange position along the inner surface of the projection piece, with the result that a center axis of the shaft-like component deviates from a center axis of the supply rod. When such deviation occurs, there arises a problem in that the shaft portion is not correctly inserted into a target location such as a screw hole or an opening of a component.

Further, the inner surface of the projection piece is flat, and hence a contact location between the flange outer peripheral portion and the inner surface of the projection piece is not fixed at a certain location. Thus, when the shaft-like component makes the circular-arc motion, a circular-arc trajectory to be generated is not uniform. Therefore, the distal end of the shaft portion is not correctly inserted into the opening being the target location, with the result that so-called erroneous supply occurs. In particular, the inner surface of the projection piece is formed so as to be long in an axial direction of the supply rod. Thus, a center point of the circular-arc motion deviates in the axial direction, so that the circular-arc trajectory with respect to the opening being the target location is not generated at the certain location. Therefore, there is a problem in that accurate insertion into the opening is hindered.

The present invention has been provided to solve the problems described above, and has an object to allow a shaft-like component, which is retained at a distal end portion of a supply rod, to be accurately positioned on a center axis of the supply rod and inserted into an opening at a target location such that a shaft portion always generates a uniform circular-arc trajectory.

Solution to Problem

According to the present invention of claim 1, there is provided a supply rod for a shaft-like component, which is configured to supply a shaft-like component having a circular flange and a shaft portion integrated with each other, the supply rod comprising: a projection portion formed on a distal end surface of the supply rod with which a surface of the flange is to be brought into close contact; and a circular-arc receiving surface formed at a boundary portion between the distal end surface and the projection portion, the circular-arc receiving surface fitting an outer peripheral portion of the flange, wherein the circular-arc receiving surface has a circular-arc shape about a center axis of the supply rod, wherein, when seen in a cross-section direction along the center axis, one side of the circular-arc receiving surface is continuous with the distal end surface, and another side of the circular-arc receiving surface is continuous with a regulation inner surface formed on the projection portion in a state of being opposed to the distal end surface, and wherein a receiving groove is formed by the distal end surface, the circular-arc receiving surface, and the regulation inner surface, so that the receiving groove receives an end portion of the flange, wherein a distance between the distal end surface and the regulation inner surface is set so that a control gap is defined between the regulation inner surface and the flange under a state in which the surface of the flange is held in close contact with the distal end surface, wherein the control gap has a minimized gap dimension that enables an initial circular-arc motion of the flange held in close contact with the distal end surface, and wherein the close contact of the surface of the flange with the distal end surface is achieved with a magnet of an advancing/retreating type provided in the supply rod.

Advantageous Effects of Invention

When the flange of the shaft-like component approaches the vicinity of the distal end surface of the supply rod, the flange advances to the circular-arc receiving surface formed at the boundary location between the distal end surface and the projection portion of the supply rod, thereby causing the outer peripheral portion of the flange to fit the circular-arc receiving surface and causing the surface of the flange to be attracted to the distal end surface of the supply rod by an attraction force of the magnet at the advanced position. With such operation, while one side of the circular-arc receiving surface is continuous with the distal end surface, the surface of the flange is brought into close contact with the distal end surface of the supply rod, and at the same time, the flange outer peripheral portion fits the circular-arc receiving surface. Therefore, the flange is positioned in an axial direction and a radial direction of the shaft-like component so that the shaft-like component is retained on the center axis of the supply rod.

The receiving groove configured to receive the flange end portion is formed by the distal end surface, the circular-arc receiving surface, and the regulation inner surface. The distance between the distal end surface and the regulation inner surface is set so that the control gap is defined between the regulation inner surface and the flange under the state in which the surface of the flange is held in close contact with the distal end surface. The control gap has the minimized gap dimension that enables the initial circular-arc motion of the flange held in close contact with the distal end surface.

Thus, after the positioning, when the magnet retreats so that the attraction force acting on the shaft-like component is substantially eliminated, while the shaft-like component falls by its own weight, the flange thereof moves toward the regulation inner surface side so that the control gap is eliminated. With this, the end portion of the flange performs the circular-arc motion about the receiving groove without being brought into contact with the distal end surface. The control gap has the minimized gap dimension that enables the initial circular-arc motion of the flange held in close contact with the distal end surface. Thus, the end portion of the flange has a center setting function for the circular-arc motion in the receiving groove, and the amount of deviation of the end portion of the flange with respect to the center axis direction of the supply rod becomes a substantially negligible value. Along with this, the circular-arc trajectory of the distal end of the shaft portion is always uniform, and the shaft portion can be accurately inserted into an opening of a mating component as the target location, thereby being capable of obtaining a supply rod which is highly reliable.

A circular-arc-shaped portion of the flange outer peripheral portion fits a circular-arc-shaped portion of the circular-arc receiving surface, and the surface of the flange is attracted to the distal end surface of the supply rod. With this, the shaft-like component is positioned on the center axis. Thus, even when some external force acts on the shaft-like component, accuracy of the retaining position of the shaft-like component is not easily lost, and hence the retaining position is reliably maintained.

When the length of the shaft portion and the diameter of the flange are substantially the same as each other, or the length of the shaft portion is smaller than the diameter of the flange, a gravity center position of the shaft-like component is located closer to the flange side. Thus, the circular-arc motion about the vicinity of the receiving groove becomes slower, with the result that a posture-changing speed for the shaft-like component based on the circular-arc motion becomes lower. However, according to the present invention, the control gap is minute, and hence the control gap is eliminated in a short period of time. Accordingly, substantially simultaneously with the elimination of the attraction force, a quick and smooth circular-arc motion about the receiving groove is performed. As a result, the operation time is shortened, and the supply efficiency for the shaft-like component is improved.

The present invention is provided as the supply rod in the viewpoints described above. However, the present invention may be provided also as an apparatus comprising such a supply rod.

BRIEF DESCRIPTION OF DRAWINGS

FIG. 1A is a sectional view for illustrating an entire apparatus.

FIG. 1B is a sectional view taken along the line B-B of FIG. 1A.

FIG. 1C is a sectional view taken along the line C-C of FIG. 1A.

FIG. 1D is a sectional view taken along the line D-D of FIG. 1A.

DESCRIPTION OF EMBODIMENTS

Next, a supply rod fora shaft-like component according to an embodiment of the present invention is described.

Embodiment

Figure 2A:
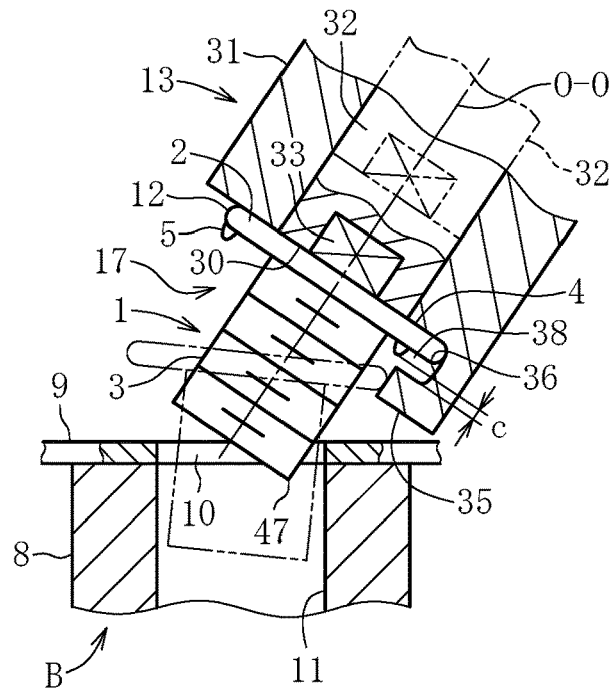
FIG. 2A is a sectional view for illustrating an advancing operation state of a supply rod.
Figure 2B:
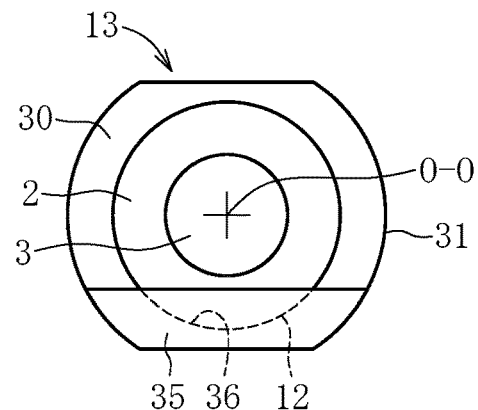
FIG. 2B is a view for illustrating the supply rod as seen from the direction B illustrated in FIG. 2A.
Figure 2C:
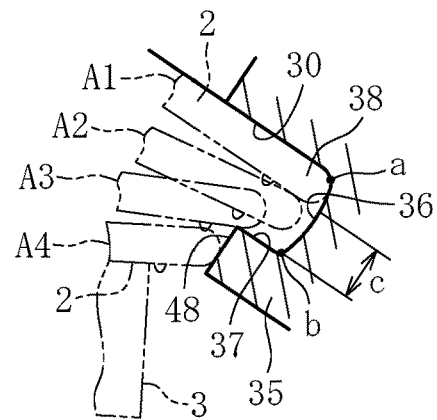
FIG. 2C is an enlarged sectional view of a lower end portion of the supply rod.
Figure 3A:
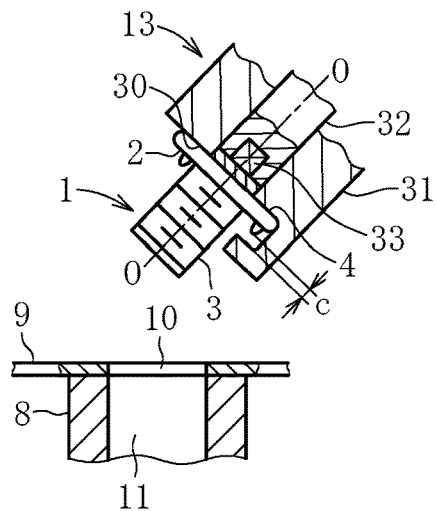
FIG. 3A is a sectional view for illustrating another advancing operation state of the supply rod.
Figure 3B:
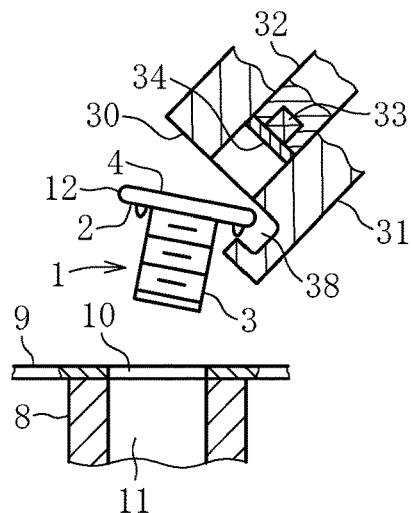
FIG. 3B is a sectional view for illustrating a state in which a shaft-like component is falling.
Figure 3C:
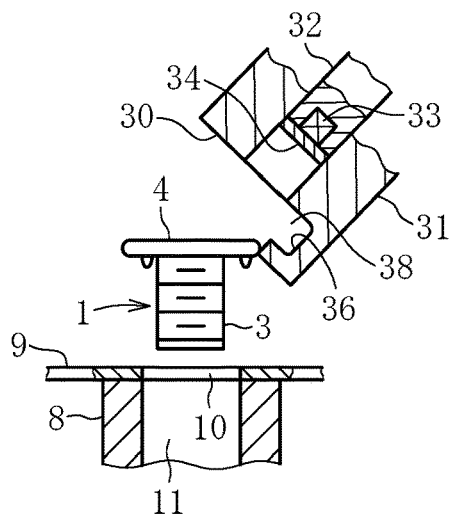
FIG. 3C is a sectional view for illustrating a state in which the shaft-like component falls.

FIG. 1 to FIG. 3 show the embodiment of the present invention.

First, a shaft-like component is described.

Various examples of the shaft-like component comprise a general bolt having a hexagonal head portion and a projection bolt having a flange. In this embodiment, the latter projection bolt is supplied. In the following description, the projection bolt is sometimes simply referred to as "bolt".

As illustrated in the drawings, a shaft-like component 1 is a projection bolt comprising a circular flange 2 and a shaft portion 3. The shaft portion 3 has a male screw and is integrally provided at a center portion of the circular flange 2. A flange surface located on a side opposite to the shaft portion 3 is a surface 4 having a flat circular shape, and three projections 5 for welding are formed at 120-degrees intervals on a back surface. The bolt 1 is made of iron, which is a magnetic material. An outer peripheral portion of the flange 2 is denoted by symbol 12, and has a round shape over the entire circumference in the case illustrated in the drawings. With regard to dimensions of parts of the projection bolt being the shaft-like component, the flange 2 has a diameter of 12 mm and a thickness of 3 mm, and the shaft portion has a length of 13 mm and a diameter of 8 mm. The bolt is also denoted by symbol 1.

Next, an entire apparatus is described.

The apparatus in this embodiment is a bolt supply apparatus and is denoted by symbol 100. In the case illustrated in the drawings, a steel-sheet component 9 is placed on a fixed electrode 8, and the shaft portion 3 is inserted into a prepared hole 10 of the steel-sheet component 9 and a receiving hole 11 of the fixed electrode 8. Moreover, although not shown in the drawings, there is a case in which the shaft portion 3 is inserted into an opening formed in a mating component. Thus, the prepared hole 10, the receiving hole 11, and the opening of the mating component described above are target locations for the supply of the shaft-like component. Illustration of a movable electrode of an advancing/retreating type which is paired with the fixed electrode 8 in a coaxial state is omitted.

A supply rod 13 configured to advance and retreat obliquely downward is accommodated in an outer cylinder 14 having a circular sectional shape. The outer cylinder 14 is fixed to a stationary member 15 such as a machine frame of the apparatus 100. An advancing/retreating output of an air cylinder 16 coupled to the outer cylinder 14 causes the supply rod 13 to advance and retreat. The advancing/retreating direction is set to such a direction that the supply rod 13 advances obliquely downward and then returns. Thus, a center axis O-O of the supply rod 13 is inclined as illustrated in the drawings.

A retaining structure portion 17 configured to retain the bolt 1 is provided at a distal end portion of the supply rod 13. Although details of the structure of the retaining structure portion 17 are described later, the bolt 1 having passed through a supply passage part for the bolt 1 is retained by the retaining structure portion 17 at the distal end portion of the supply rod 13.

There may be adopted various supply passages as the supply passage part for the bolt 1, and examples of the supply passages comprise a supply passage configured to allow the bolt 1 stopped at an end portion of a supply pipe to be transferred to the supply rod 13 and retained thereat and a supply passage configured to allow the bolt 1 to be transferred in a suspended state and retained thereat with a guide rail arranged in a substantially horizontal direction. Here, the case of the supply pipe 18 indicated by solid lines in FIG. 1 is given.

A longitudinal direction of the supply pipe 18 forms an acute angle with respect to the center axis O-O. A welding portion 19, which is indicated in a solid black color, integrates the supply pipe 18 with the outer cylinder 14. A supply hose 20, which is joined to the supply pipe 18 and is made of a synthetic resin, extends from a part feeder (not shown).

The supply pipe 18 has a circular cross section and has a stopper member 21 formed at a terminal end thereof. In order to transfer the bolt 1 stopped at the stopper member 21 to the retaining structure portion 17, an outlet opening 22 is formed at a lower portion of the supply pipe 18. In order to temporarily lock the bolt 1 having reached the stopper member 21, a gate member 23 of an opening/closing type is provided.

A method of advancing and retreating the gate member 23 is illustrated in FIG. 1(B). The air cylinder 26 is fixed to a bracket 25 coupled to the outer cylinder 14, and the gate member 23 is coupled to a piston rod 27 of the air cylinder 26.

A magnet 28 is fixed to an end portion of the outer cylinder 14. When the gate member 23 is opened, an attraction force of the magnet 28 causes the bolt 1 to be forcibly transferred to the retaining structure portion 17 through the outlet opening 22. Meanwhile, as indicated by the two-dot chain lines in FIG. 1(A) and as illustrated in FIG. 1(D), in a case in which the bolt 1 is forcibly transferred in a suspended state (hung state) along a guide rail 29 extending in a substantially horizontal direction, the bolt 1 reaches the retaining structure portion 17 at high speed. Thus, in the case of using the guide rail 29, the magnet 28 may be omitted. Alternatively, also in a case in which the center axis O-O in FIG. 1(A) is further laid so that the bolt 1 is transferred to be dropped onto the retaining structure portion 17, the magnet 28 may be omitted. Therefore, according to the present invention, the presence or absence of the magnet 28 may be suitably selected. As illustrated in FIG. 1(A), the magnet 28 is accommodated in a container made of stainless steel being a non-magnetic material, and the container is welded to an end portion of the outer cylinder 14.

Next, the retaining structure portion is described.

The retaining structure portion 17 is configured to reliably retain the bolt 1 at a predetermined location on the distal end portion of the supply rod 13 and, after the supply rod 13 advances, insert the bolt 1 into a target location such as the prepared hole 10 and the receiving hole 11 being.

Clearer illustrations are given in FIG. 2, and description is made mainly with reference to FIG. 2. A distal end surface 30 with which a surface 4 of the flange 2 is to be brought into close contact is formed at the distal end portion of the supply rod 13. The supply rod 13 comprises an inner shaft 32 inserted into a hollow shaft 31 having a hollow tube shape so that the inner shaft 32 can advance and retreat. The distal end surface 30 is formed of an end surface of the hollow shaft 31 and an end surface of the inner shaft 32 which are arranged on one imaginary plane.

The close contact of the surface 4 of the flange 2 with the distal end surface 30 is achieved with a magnet (permanent magnet) 33 of an advancing/retreating type provided in the supply rod 13. Here, the magnet 33 is mounted at an end portion of the inner shaft 32. An end surface of the magnet 33 is also arranged on the imaginary plane and forms a part of the distal end surface 30. However, it is not always required that the magnet 33 be exposed in such a manner. As illustrated in FIG. 3, a cover plate 34 may be mounted to the end surface of the inner shaft 32, and a surface of the cover plate 34 may be arranged on the imaginary plane.

A projection portion 35 is formed on the distal end surface 30 of the supply rod 13. The projection portion 35 extends from the hollow shaft 31 on a lower side along the inclination of the supply rod 13, that is, on a lower side of the center axis O-O and projects over a region corresponding to an end portion of flange 2 as illustrated in FIG. 2(B). FIG. 2(B) is a view for illustrating a state in which the supply rod 13 is seen from the direction of the arrow B in FIG. 2(A). Thus, in FIG. 2(B), the projection portion 35 projects in a region covering about 90 degrees on a lower side of the supply rod 13. In order to cause the attraction force of the magnet 28 to more strongly act on the bolt 1, the hollow shaft 31 is made of a non-magnetic material, and the projection portion 35 is also made of a non-magnetic material.

At a boundary location between the distal end surface 30 and the projection portion 35, there is formed a circular-arc receiving surface 36 fitting the outer peripheral portion 12 of the flange 2. In FIG. 2(B), the projection portion 35 projects over the region covering about 90 degrees on a lower side of the supply rod 13, and hence the circular-arc receiving surface 36 is also formed over the region covering about 90 degrees on a lower side of the supply rod 13. That is, the circular-arc receiving surface 36 is formed so as to extend in a region of about 90 degrees of the flange 2. The circular-arc shape of the circular-arc receiving surface 36 is a circular arc about the center axis O-O of the supply rod 13.

As illustrated in the drawings, especially as illustrated in FIG. 2(A) and FIG. 2(C), the outer peripheral portion 12 of the flange 2 has a round shape. Thus, the circular-arc receiving surface 36 corresponding to the outer peripheral portion 12 also has a round recessed shape. In case where the outer peripheral portion 12 of the flange 2 has an angular cylindrical shape, the circular-arc receiving surface 36 also has a shape which enables close contact with such a cylindrical shape. Please note that the term of "circular-arc" about the circular-arc receiving surface 36 or the outer peripheral portion 12 of the flange 2 does not mean a roundness which appears in a cross-section along the center axis O-O of the supply rod 13 or the center axis of the bolt 1, but means a shape which appears in a cross-section perpendicular to the center axis O-O of the supply rod 13 or the center axis of the bolt 1.

As the bolt 1 is transferred, when the outer peripheral portion 12 of the flange 2 fits the circular-arc receiving surface 36, and the surface 4 of the flange 2 is attracted to the distal end surface 30 with the magnet 33, the flange 2 is positioned in the axial direction and the radial direction of the bolt 1, and the bolt 1 is retained on the center axis O-O of the supply rod 13. At this time, the outer peripheral portion 12 of the flange 2 fits the circular-arc receiving surface 36 in a contact state over an angle range of about 90 degrees.

In the cross-section direction along the center axis O-O, that is, when seen on the cross sections illustrated in FIG. 2(A) and FIG. 2(C), one side of the circular-arc receiving surface 36 is continuous with the distal end surface 30, and another side of the circular-arc receiving surface 36 is continuous with a regulation inner surface 37 formed on the projection portion 35 in a state of being opposed to the distal end surface 30. As illustrated in FIG. 2(C), the continuous location between the circular-arc receiving surface 36 and the distal end surface 30 is indicated by a black point "a". Moreover, the continuous location between the circular-arc receiving surface 36 and the regulation inner surface 37 is indicated by a black point "b".

A receiving groove 38 configured to receive the end portion of the flange 2 is formed by the distal end surface 30, the circular-arc receiving surface 36, and the regulation inner surface 37. A distance between the distal end surface 30 and the regulation inner surface 37 is set so that a control gap "c" is defined between the regulation inner surface 37 and the flange 2 (welding protrusion 5) under a state in which the surface 4 of the flange 2 is held in close contact with the distal end surface 30. That is, a groove width of the receiving groove 38 is set so that the control gap "c" is defined. The control gap "c" is a minimized gap dimension that enables an initial circular-arc motion of the flange 2 held in close contact with the distal end surface 30. The control gap "c" is illustrated in FIG. 2(C) in an enlarged manner for easy understanding.

The control gap "c" in this embodiment is an air gap defined between the welding protrusion 5 and the regulation inner surface 37. When the welding protrusion 5 is not formed, the control gap "c" is defined between the back surface of the flange 2 and the regulation inner surface 37.

As illustrated in FIG. 1(C) and FIG. 2(B), the supply rod 13 has an oval shape, and a planar portion thereof makes sliding motion with respect to the stationary member, thereby preventing a rotary motion of the supply rod 13 during an advancing and retreating operation of the supply rod 13.

Next, an advancing/retreating structure for the magnet is described.

The magnet 33 is separated away from the flange 2 to substantially eliminate the attraction force acting on the bolt 1. As a structure for such operation, there may be adopted a structure of coupling a thin rod member to the magnet 33 and advancing and retreating the rod member to advance and retreat the magnet 33 with respect to the flange 2, or a structure of coupling an air cylinder to the end portion of the inner shaft 32 and advancing and retreating the inner shaft 32. Here, the latter structure of an inner-shaft advancing/retreating type is adopted.

As described above, the supply rod 13 comprises the inner shaft 32 inserted into the hollow shaft 31 having a hollow tube shape so that the inner shaft 32 can advance and retreat. A regulation pin 39 fitted to the inner shaft 32 projects into the outer cylinder 14 through an elongated hole 40 opened in the hollow shaft 31. A compression coil spring 41 is interposed between an upper end portion of the inner shaft 32 and an inner end surface of the hollow shaft 31. A resilient force of the compression coil spring 41 acts in a direction of pushing out the inner shaft 32, and the regulation pin 39 is held in abutment against a lower end of the elongated hole 40 by the resilient force. In this state, the distal end surface 30 forms a flat attraction surface.

An air cylinder 43 as a driving unit is fixed to an outer surface of the outer cylinder 14. An engagement piece 45 is coupled to a piston rod 44 of the air cylinder 43 and projects into the outer cylinder 14 through an elongated hole 46 opened in the outer cylinder 14. Relative positions of the engagement piece 45 and the regulation pin 39 are set so that, when the supply rod 13 moves by a stroke of a predetermined length, the regulation pin 39 can be opposed to the engagement piece 45.

Next, an operation is described.

The bolt 1 having been transferred from the supply hose 20 to the supply pipe 18 is brought into abutment against the stopper member 21 and stops thereat, and is brought into a stationary state by the gate member 23 at a closing position. Next, when the gate member 23 is opened by an operation of the air cylinder 26, the bolt 1 is transferred in a substantially horizontal direction in a standing state by the attraction force of the magnet 28, and the flange 2 reaches the vicinity of the distal end surface 30 and further advances toward the circular-arc receiving surface 36. With this, the outer peripheral portion 12 of the flange 2 fits the circular-arc receiving surface 36, and the surface 4 of the flange 2 is attracted to the distal end surface 30 by the attraction force of the magnet 33 at the advanced position. A contact range of the outer peripheral portion 12 with respect to the circular-arc receiving surface 36, that is, a fitting region is about 90 degrees in this case. The range indicated by the chain lines in FIG. 2(B) is the contact range described above.

Therefore, through the contact of the outer peripheral portion 12 of the flange 2 with the circular-arc receiving surface 36 and through the attraction of the surface 4 of the flange 2 toward the distal end surface 30 by the attraction force of the magnet 33 located at the advanced position, the bolt 1 is positioned in the axial direction and the radial direction, and the bolt 1 is retained on the center axis O-O of the supply rod 13.

After that, when the operation of the air cylinder 16 causes the supply rod 13 to advance over a predetermined length so that a distal end corner portion 47 of the shaft portion 3 advances into the prepared hole 10, the supply rod 13 stops (see the illustration indicated by the two-dot chain lines in FIG. 1(A) and the illustration indicated by the solid lines in FIG. 2(A)), and at the same time, the regulation pin 39 stops immediately before reaching the engagement piece 45. Then, when the engagement piece 45 is brought into abutment against the regulation pin 39 by the compression operation of the air cylinder 43, the inner shaft 32 retreats while compressing the compression coil spring 41. With this retreating action, as indicated by the two-dot chain lines in FIG. 2(A), the magnet 33 also retreats, thereby eliminating the attraction force with respect to the bolt 1.

As a result of the elimination of the attraction force, the bolt 1 starts falling by its own weight. The bolt 1 performs the circular-arc motion about the location at which the flange end portion enters the receiving groove 38, and the shaft portion 3 completely passes through the prepared hole 10. Then, the insertion is completed.

A movement of the flange end portion in the receiving groove 38 is illustrated in FIG. 2(C). A state in which the flange 2 is held in close contact with the distal end surface 30 corresponds to an A1 state. Here, when the attraction force of the magnet 33 is eliminated, the bolt 1 starts falling by its own weight, and a movement position of the flange end portion given at this time corresponds to an A2 state. This is a state in which a slight circular-arc movement is started by the movement of the flange 2 so that the control gap "c" is eliminated. After that, as the falling movement of the bolt 1 further proceeds, the lower surface of the flange 2 moves while sliding on the corner portion of the regulation inner surface 37 so that an A3 state is given. After that, the bolt 1 falls while sliding on the inner surface 48 of the projection portion 35 so as to be brought into an A4 state, and the shaft portion 3 is completely fitted into the receiving hole 11 to the farthest side.

The movement of the flange end portion is as described above. The control gap "c" illustrated in FIG. 2(C) is illustrated in an exaggerated manner. Through the elimination of the control gap "c", the circular-arc movement of the flange end portion is enabled in the receiving groove 38 without sliding on the distal end surface 30, and such movement gives a center setting function for the circular-arc motion of the flange end portion.

Next, another example is described.

In the case illustrated in FIG. 1 and FIG. 2, when the supply rod 13 advances over the predetermined length and stops thereat, the distal end corner portion 47 of the shaft portion 3 advances into the prepared hole 10, and the circular-arc motion is performed from this state. Then, the insertion is completed. In the case illustrated in FIG. 3, when the supply rod 13 advances over the predetermined length and stops thereat, the distal end corner portion 47 of the shaft portion 3 is separated above the prepared hole 10. When the operation illustrated in FIG. 2(C) is performed from the position above, the shaft portion 3 is dropped from the position of FIG. 3(C) into the prepared hole 10.

In place of the air cylinder of various types described above, an electric motor configured to give an advancing/retreating output can also be adopted.

The operations of the air cylinder 16 for advancing and retreating the supply rod 13 and the operations of the air cylinder 43 for advancing and retreating the engagement piece 45 described above can easily be performed by a control method which is generally adopted. Predetermined operations can reliably be performed through combinations of, for example, an air switching valve configured to operate based on signals from a control device or a sequence circuit and a sensor configured to emit a signal at a predetermined position of the air cylinder and sent the signal to the control device.

Actions and effects of the embodiment described above are given below.

When the flange 2 of the bolt 1 approaches the vicinity of the distal end surface 30 of the supply rod 13, the flange 2 advances to the circular-arc receiving portion 36 formed at the boundary location between the distal end surface 30 and the projection portion 35 of the supply rod 13, thereby causing the outer peripheral portion 12 of the flange 2 to fit the circular-arc receiving surface 36 and causing the surface 4 of the flange 2 to be attracted to the distal end surface 30 of the supply rod 13 by the attraction force of the magnet 33 at the advanced position. With such operation, while the one side of the circular-arc receiving surface 36 is continuous with the distal end surface 30, the surface 4 of the flange 2 is brought into close contact with the distal end surface 30 of the supply rod 13, and at the same time, the flange outer peripheral portion fits the circular-arc receiving surface 36. Therefore, the flange 2 is positioned in the axial direction and the radial direction of the bolt 1 so that the bolt 1 is retained on the center axis O-O of the supply rod 13.

The receiving groove 38 configured to receive the flange end portion is formed by the distal end surface 30, the circular-arc receiving surface 36, and the regulation inner surface 37. The distance between the distal end surface 30 and the regulation inner surface 37 is set so that the control gap "c" is defined between the regulation inner surface 37 and the flange 2 under the state in which the surface 4 of the flange 2 is held in close contact with the distal end surface 30. The control gap "c" has the minimized gap dimension that enables the initial circular-arc motion of the flange 2 held in close contact with the distal end surface 30.

Thus, after the positioning, when the magnet 33 retreats so that the attraction force acting on the bolt 1 is substantially eliminated, while the bolt 1 falls by its own weight, the flange 2 moves toward the regulation inner surface 37 side so that the control gap "c" is eliminated. With this, the end portion of the flange 2 performs the circular-arc motion about the receiving groove 38 without being brought into contact with the distal end surface 30. The control gap "c" has the minimized gap dimension that enables the initial circular-arc motion of the flange 2 held in close contact with the distal end surface 30. Thus, the flange end portion of the flange 2 has a center setting function for the circular-arc motion in the receiving groove 38, and the amount of deviation of the flange end portion with respect to the center axis O-O direction of the supply rod 13 becomes a substantially negligible value. Along with this, the circular-arc trajectory of the distal end of the shaft portion 3 is always uniform, and the shaft portion 3 can be accurately inserted into the prepared hole 10 of the steel-sheet component 9 or the receiving hole 11 of the fixed electrode 8 as the target location, thereby being capable of obtaining the supply rod 13 which is highly reliable.

A circular-arc-shaped portion of the flange outer peripheral portion fits a circular-arc-shaped portion of the circular-arc receiving surface 36, and the surface 4 of the flange 2 is attracted to the distal end surface 30 of the supply rod 13. With this, the bolt 1 is positioned on the center axis O-O. Thus, even when some external force acts on the bolt 1, accuracy of the retaining position of the bolt 1 is not easily lost, and hence the retaining position is reliably maintained.

When the length of the shaft portion 3 and the diameter of the flange 2 are substantially equal to each other, or the length of the shaft portion 3 is smaller than the diameter of the flange 2, a gravity center position of the bolt 1 is located closer to the flange 2 side. Thus, the circular-arc motion about the receiving groove 38 becomes slower, with the result that a posture-changing speed for the bolt 1 based on the circular-arc motion becomes lower. However, in this embodiment, the control gap "c" is minute, and hence the control gap "c" is eliminated in a short period of time. When the lower surface of the flange 2 is brought into abutment against the corner portion of the regulation inner surface 37, the circular-arc movement is accelerated by an inertial force of the shaft portion 3. Accordingly, substantially simultaneously with the elimination of the attraction force of the magnet 33, a quick and smooth circular-arc motion about the receiving groove 38 is performed. As a result, the operation time is shortened, and the supply efficiency for the bolt 1 is improved.

As described above, when a ratio of the length of the shaft portion 3 to the diameter of the flange 2 is approximately 1, or when the length of the shaft portion 3 is significantly smaller than the diameter of the flange 2, a rotational force of the shaft portion 3 generated by the own weight of the shaft portion 3 becomes smaller. However, as in this embodiment, after the movement of the flange 2 up to the elimination of the control gap "c", the flange 2 is received by the end portion of the regulation inner surface 37, that is, by the corner portion of the regulation inner surface 37. Therefore, the inertial force generated by such receiving action increases the rotational force of the shaft portion 3 and accelerates the circular-arc motion, which is effective for shortening the supply time for the bolt 1.

INDUSTRIAL APPLICABILITY

As described above, with the supply rod according to the present invention, the shaft-like component retained at the distal end portion of the supply rod is accurately positioned on the center axis of the supply rod, and is inserted into the opening as the target location while allowing the shaft portion to always generate the uniform circular-arc trajectory. Thus, the supply rod can be used in a wide variety of industrial fields such as a welding step for a vehicle body of an automobile and a welding step for a plate metal of a home electric appliance.

REFERENCE SIGNS LIST

1 shaft-like component, projection bolt
2 flange
3 shaft portion
4 surface
9 steel-sheet component
10 prepared hole
12 outer peripheral portion
13 supply rod
14 outer cylinder
17 retaining structure portion
28 magnet
30 distal end surface
33 magnet
35 projection portion
36 circular-arc receiving surface
37 regulation inner surface
38 receiving groove
47 distal end corner portion
100 bolt supply apparatus
c control gap
O-O center axis

The invention claimed is:

1. A supply rod for supplying a shaft-like component having a circular flange and a shaft portion integrated with each other, the supply rod comprising:
   a projection portion formed on a distal end surface of the supply rod with which a surface of the circular flange is to be brought into close contact; and
   a circular-arc receiving surface formed at a boundary portion between the distal end surface and the projection portion, the circular-arc receiving surface fitting an outer peripheral portion of the circular flange,
   wherein the circular-arc receiving surface has a circular-arc shape about a center axis of the supply rod,
   wherein, when seen in a cross-section direction along the center axis, one side of the circular-arc receiving surface is continuous with the distal end surface, and another side of the circular-arc receiving surface is continuous with a regulation inner surface formed on the projection portion in a state of being opposed to the distal end surface,
   wherein a receiving groove is formed by the distal end surface, the circular-arc receiving surface, and the regulation inner surface, so that the receiving groove receives an end portion of the circular flange,
   wherein a distance between the distal end surface and the regulation inner surface is set so that a control gap is defined between the regulation inner surface and the circular flange under a state in which the surface of the circular flange is held in close contact with the distal end surface,
   wherein the control gap has a minimized gap dimension that enables an initial circular-arc motion of the circular flange held in close contact with the distal end surface, and
   wherein the close contact of the surface of the circular flange with the distal end surface is achieved with a magnet of an advancing/retreating type provided in the supply rod.

* * * * *